United States Patent
Puigferrat et al.

(10) Patent No.: US 10,631,551 B2
(45) Date of Patent: Apr. 28, 2020

(54) PROCESS FOR PRODUCING LACTOSE-FREE MILK WITH HIGH IN PROTEIN AND CALCIUM AND MILK WITHOUT SWEETNESS

(71) Applicant: Comercializadora de Lácteos y Derivados, S. A. de C. V., Gómez Palacio, Durango (MX)

(72) Inventors: Ricardo Arista Puigferrat, Coahuila (MX); Daniel Isaac Valenzuela Rodriguez, Coahuila (MX); Juan Carlos de Santiago Ubaldo, Coahuila (MX); Rocio Leyva Jarquin, Coahuila (MX); José Ángel Martinez Gallegos, Coahuila (MX)

(73) Assignee: COMERCIALIZADORA DE LACTEOS Y DERIVADOS, S.A. DE C.V., Durango (MX)

( * ) Notice: Subject to any disclaimer, the term of this patent is extended or adjusted under 35 U.S.C. 154(b) by 373 days.

(21) Appl. No.: 15/067,777

(22) Filed: Mar. 11, 2016

(65) Prior Publication Data

US 2017/0196234 A1   Jul. 13, 2017

(30) Foreign Application Priority Data

Jan. 7, 2016 (MX) .................. MX/A/2016/000156

(51) Int. Cl.
*A23C 9/142* (2006.01)
*A23C 9/15* (2006.01)

(52) U.S. Cl.
CPC .......... *A23C 9/1422* (2013.01); *A23C 9/1427* (2013.01); *A23C 9/1512* (2013.01); *A23C 2210/20* (2013.01); *A23C 2250/10* (2013.01); *A23C 2250/15* (2013.01)

(58) Field of Classification Search
CPC .... A23C 9/1422; A23C 9/1427; A23C 9/1512
See application file for complete search history.

(56) References Cited

U.S. PATENT DOCUMENTS

| | | | | |
|---|---|---|---|---|
| 2005/0196508 A1* | 9/2005 | Wang | ................... | A23C 9/1422 426/580 |
| 2009/0123602 A1* | 5/2009 | Yan | ...................... | A23C 9/1209 426/39 |
| 2013/0230623 A1* | 9/2013 | Sibakov | ............... | A23C 9/1206 426/42 |

OTHER PUBLICATIONS

"How do we eliminate lactose . . . ?" 2019. http://organicvalley.custhelp.conn/app/answers/detail/a_id/201/kw/lactose%20free.*

* cited by examiner

*Primary Examiner* — Anthony J Weier
(74) *Attorney, Agent, or Firm* — Polsinelli PC

(57) ABSTRACT

The present invention is related with the milk industry in general and with the processing industry of milk to produce for lactose-free milk and assessment of the subproduct in particular, and even more particularly in the milk processing industry through different separating means of the components such as micro- and nano filtration.

The function of the invention is to permit a lactose-free milk or a milk without lactose with a sensorial profile similar to that of normal pasteurized milk without lactose using the essential separation steps to reduce production costs, yet another objective was to determine the effect on the organoleptic characteristics of the concentration of natural milk components and concentrations which achieve the first objective, still another objective is to determine the ratio between retentate and permeate to obtain a sensorial profile equivalent to that of a normal pasteurized mil without lactose.

21 Claims, No Drawings

PROCESS FOR PRODUCING LACTOSE-FREE MILK WITH HIGH IN PROTEIN AND CALCIUM AND MILK WITHOUT SWEETNESS

CROSS REFERENCE TO RELATED APPLICATIONS

This application claims priority to Application No. MX/a/2016/000156 filed in Mexico on Jan. 7, 2016, under 35 U.S.C. § 119, the entire contents of which are hereby incorporated by reference.

FIELD OF THE INVENTION

The present invention is related with the milk industry in general and the processing industry milk for produce milk with a certain specialization, as no sweetness milks and milk are high in protein and calcium for infants.

BACKGROUND OF THE INVENTION

Market segmentation has led to the need to produce milk with different characteristics, such as milk low in lactose, milk for infants with protein and high calcium.

Although there is the idea that milk is the liquid extracted from the udders of mammals, since this product is the raw material for the production of products covered by this description, you can name milk to these products, given that not have any foreign component.

In milk low in lactose, there are processes using the lactase and rest in the milk the monosaccharides glucose and galactose, which form the disaccharide lactose. Being the galactose sweeter than lactose, these processes can result in milk with a pronounced sweetness.

In U.S. Pat. No. 5,334,399 is disclosed a solution to this situation and is to add potassium chloride to the product where the enzymatic hydrolysis was performed. This solution is practical, but often is not allowed for the breach of official standards in some countries.

As one of these processes we have the ones who using membranes (filters) of different size (pore size) to have different filtration processes, including ultrafiltration. Depending on the pore size, filtration becomes more selective in the following order of processes called:
1. Microfiltration.—Used to retain particles of the size of bacterias and spores. Let pass proteins, fat globules, sugars, amino acids, minerals and water.
2. Ultrafiltration. Used for retaining particles of the size of protein and fat globules. Let pass sugars, amino acids, minerals and water.
3. Nanofiltration. Used for retaining particles of the size of sugars such as sucrose or table sugar. Let pass minerals and water.
4. Reverse Osmosis. Let pass almost exclusively water together with very simple minerals.

With this knowledge, it is not possible yet to determine a milk treatment process to obtain milk with lactose-free with similar organoleptic characteristics to the ultra-pasteurized milk without desugared process.

That is, for example, a process is currently known which has the following series of steps:

The equipment used are of Membrane, which are capable of doing microfiltration processes, ultrafiltration, nanofiltration and reverse osmosis of fractionation of the various components in this case of milk.

The general process for producing lactose-free milk or low-lactose is:
Submit a low-fat or skim milk to the ultrafiltration process for obtaining the respective retentate and permeate.
The UF permeate it is submitted to the nanofiltration process similarly for obteing in the same way the respective retentate and permeate.
Is performed a mixed to the UF retentate and NF permeate.

With these two processes, UF and NF can perform a partial or nearly complete elimination of the lactose content, where part of the minerals are also lost. This mixture is subjected then to a process of enzymatic hydrolysis with enzyme β-galactosidase to finish to reduce the lactose content generating the glucose and galactose.

You can also perform reconstitution of milk using only the UF retentate with the addition of water to the desired level of protein or include the reverse osmosis processes for concentrating minerals of the NF permeate and be used in the reconstructing milk. This process results in a milk with organoleptic strange features for a normal milk and this process does not take this into account this situation, as well as the possibility of using unit operations that makes more expensive the production process.

Indeed, an invention that shows that the steps (micro, ultra and nanofiltration and reverse osmosis) are essential to achieve a process of desugared that achieves obtaining a lactose-free milk with a sensory profile equivalent to that of a normal pasteurized milk (with lactose), with a partial removal of lactose by physical means in a first stage and subsequent removal of the remaining lactose to the use of the enzyme lactase (β-galactosidase) and the obtaining a complete lactose as a byproduct, it will be contributing knowledge non existing in the state of the art and this will deserve a patent for be protected.

The patent document CA2701066 of the inventor Vernazza, Francesco, discloses a method to obtain milk with low sugar starting from milk, and comprising at least two steps: a first step in which the milk is subjected to ultrafiltration so that produce, at the outlet, a permeate ultrafiltration and ultrafiltration retentate; and a second step in which the permeate of ultrafiltration is subjected to a nanofiltration operation so as to produce at the output a nanofiltration permeate and a nanofiltration concentrate. The nanofiltration permeate is continuously recycled directly to the nanofiltration operation, in order to dilute the retentate of the ultrafiltration and get down milk sugars starting from the latter. In this method does not take into account the physicochemical conditions to achieve a milk with organoleptic characteristics.

The Mexican patent document PA/a/2004/011243, of Janne-SAHLSTEIN discloses a method for producing lactose-free milk. The process of the invention is characterized by the steps of subjecting a product of milk to ultrafiltration (UF), nanofiltration (NF) and concentration by reverse osmosis, followed by the addition of salt to the retentate of UF. The drawback of this method is the inclusion of a step of adding salt to the retentate of ultrafiltration step and the additional step of concentration by reverse osmosis makes more expensive the method.

In the Mexican patent document PA/a/2005/002049 a consistent method disclosed in the separation of milk components, comprising the steps of:

Make pass the milk through a filtration machine in a flow of just one direction; ultrafiltration of milk in a first stage filtration using ultrafiltration means to produce a first liquid filtrate and a first concentrate, wherein the lactose content of the first filtrate is not more than 5.5% by weight; nanofiltration of the first liquid filtrate in the second filtration step using nanofiltration means to produce a second liquid filtrate and a second concentrate, wherein the lactose content of the second filtered is no more than 0.15% by weight; reverse osmosis of the second liquid filtrate in a third stage of filtration using reverse osmosis means to produce a third liquid filtrate and a third concentrate, wherein the lactose content of the third concentrate is not more than 0.06% by weight; and wherein the first filter, second filter and third filter are removed from the filter apparatus through a first outlet, a second output and a third output respectively. Again we have in the document the emergence of a reverse osmosis step.

In U.S. Pat. No. 8,445,052 (Hoist et al) describes a process for producing substantially free or lactose-free milk, preferably without the addition of water, and the product obtained by the process. The process comprises the steps of: a) ultrafiltration of the original milk to obtain a first permeate and a first retentate; b) nanofiltration of said first permeate to obtain a second permeate and a second retentate; mixing the first retentate with the second permeate to obtain a mixture; and d) hydrolyzing the lactose remaining in said mixture to obtain a hydrolyzed milk. The process results in a lactose-free product with the flavor of the original milk. The disadvantage of this process is that it does not take into account the characteristics of the original milk regarding to the composition of fats, proteins and carbohydrates.

Punctuating, the processes of the prior art have the following disadvantages: or only employ stage UF and mixed the retentate with softened water directly to reach the levels of fat and protein desired, doing with this, that these levels will generally be higher to obtain products with good sensory profile.

Or consists in a complicated process and thus higher cost of operation to use 3 stage filtration; UF, NF and inverse osmosis.

Or could to add flavor achieving a product, that according to Mexican regulation no longer be called milk and would have to be referred to as flavored milk.

With the development of research requirements in food, has been detected, in addition to the need for low milk lactose, the needs of milk high in calcium and protein and the taste of a certain sector of the population by low milks sweetness. Features of milks so far undeveloped.

And although some products have performed manufacturing process of these types of milk, have been carried out by adding proteins and calcium outside the milk itself, sometimes, in the best case, drawn from other milk. This situation means that the organoleptic characteristics of the resulting milk is modified significantly.

A proceeding, by which a milk high in protein and calcium is achieved, while retaining the organoleptic characteristics of normal milk, would be an interesting contribution to the state of the art.

OBJECTIVES OF THE INVENTION

One objective of the present invention is to make possible a high proteins content of own milk and high content of calcium.

Another objective was to get low sweetness milks without adding any additives and using only separation processes the components of milk.

Another object was raised the before reaching the objectives without discrediting the aroma of cow's milk, in the sense of the technology of term flavor of aroma.

Yet another objective is to determine the ratio between retentate and permeate to obtain an equivalent of a normal pasteurized milk sensory profile.

Another objective is to determine the necessary separation processes for a faster and cheaper process.

And all those objectives which will become into a patent by the present disclosure.

BRIEF DESCRIPTION OF THE INVENTION

In short, the process object of the present invention begins with the standardization of milk treated.

Next, the equipment used is of membrane capable of performing processes of microfiltration, ultrafiltration, nanofiltration and reverse osmosis to the fractionation of the various components in this case milk. The general process for producing lactose-free milk or low lactose, with high in protein and calcium, is:

Submit a low-fat milk or partially skim to the ultrafiltration process for obtaining a respective retentate and permeate.

The UF permeate is then subjected to nanofiltration process similarly for the respective retentate and permeate.

The NF permeate is sometimes subjected to reverse osmosis, in which obtained a permeate and retentate.

It makes a mixed of the retentate UF and the permeate NF and sometimes it used the reverse osmosis with the UF retentate.

With these processes UF and NF can perform a partial or nearly complete elimination of lactose content where it recover almost all the minerals present. This mixture is then subjected to a process of enzymatic hydrolysis with β-galactosidase enzyme to finish reducing the content of lactose, generating glucose and galactose.

Obtaining lactose-free milk with higher content of protein and calcium of long life retaining the flavor of a fresh milk, by partial removal of lactose and water by physical means and concentration of protein and calcium in a first stage and subsequent removal of the remaining lactose by hydrolysis using the enzyme lactase (β-galactosidase).

Raw milk is standardized to the required level of fat and protein, in a value of butterfat from 1.4 to 2.2% is set, and the level of protein after standardization is a value from 2.9 to 3.7%.

In our process, the proportions in the UF step are: 55 to 63%, preferably 56 to 62%, even more preferably 57 to 61%, even better 58 to 60% of retentate; and for the permeate of 37 to 45%, preferably 38 to 44%, even more preferably, 39 to 43%, even better 40 to 42%.

The permeate obtained of the UF is subjected to the NF process to obtain a retentate (water, lactose and minerals) and a permeate (water and minerals).

For passage of NF, our process establishes the following proportions to have: in the retentate of 30 to 38%, preferably 31 to 37%, even more preferably 32 to 36%, even better 33 to 35% of between; and for the permeate of 62 to 70%, preferably 63 to 69%, even more preferably from 64 to 68%, even better from 65 to 67%.

The diafiltration process is used primarily to streamline the recovery of mineral salts and of possible flavoring aromatics, and begins when is critical the level of lactose (crystallization of membrane lactose) in the NF retentate, maintaining the levels of lactose but near this point undiluted over the retentate.

In the diafiltration only the necessary water is used to restore the water is lost during the process, so that the mix of the retentate and UF permeate NF is obtained practically the same volume of milk with which began just getting a lower yield due to the adjustment of protein require to provide better sensory profile. The obtained mixture of the UF retentate and NF permeate "reconstituted milk" is then subjected to UHT process and then adding thereto the enzyme needed per container to hydrolyze lactose remaining.

Using permeate the UF of milk causes a limitation in the concentration of retentate NF (between lactose and calcium), as there is a risk of crystallization on the membrane, so it is set to maintain a concentration of retentate between 9 and 10° Bx, preferably 10 to 11° Bx, even more preferably 11 to 12, even better from 12 to 13° Bx while the diafiltration process is performed.

In order to generate a similar sweetness to the normal pasteurized milk at the moment to realize the enzymatic hydrolysis, step that also includes our process, in steps of UF and NF, you must remove 35 to 40%, preferably between 36 and 39 sweetness %, and most preferably from 37 to 38%; reconstituted milk should be between 2.7 to 3.5% lactose, preferably between 2.8 to 3.4%, and most preferably from 2.9 to 3.3% and even better between 3.0 to 3.2% lactose.

Another parameter defining our process is the ratio obtained of retentate and permeate in the process of UF and NF. Our process has the following proportions: The proportions in the UF process are: 55 to 63%, preferably 56 to 62%, even more preferably 57 to 61%, even better 58 to 60 of retentate; and for the permeate of 37 to 45%, preferably 38 to 44%, even more preferably, 39 to 43%, even better 40 to 42%. For process NF: in the retentate of 30 to 38%, preferably 31 to 37%, even more preferably 32 to 36%, even better 33 to 35%; and for the permeate of 62 to 70%, preferably 63 to 69%, even more preferably from 64 to 68%, even better from 65 to 67%.

Next, this milk is subjected to UF process wherein a retentate "milk concentrate" is obtained (between 4.7 to 5.3%, preferably from 4.8 to 5.2%, and even more preferably from 4.9 to 5.1%) which will be mixed later with the permeate resulting from the NF. This concentration must be reached in the retentate in the ultrafiltration step to obtain the level of lactose in reconstituted milk.

DETAILED DESCRIPTION OF THE INVENTION

In the process of the present disclosure, we have the tank 1 of the standardized skim milk. This milk is fed into the computer ultrafiltration 2, outlining the broken line diagonal membrane. With this specification we can say that line 2a leads the retentate to the tank 5. On the other hand line 2b leads the permeate from the UF to the permeate tank 3.

The Line 3a leads the permeate to the tank NF 4. Meanwhile line 3b leading the permeate with the addition of water which stored in the tank 7, of mixing of retentate diafiltration. The tank 9 has water to inject to the NF retentate.

The part of the retentate that is not recirculated is sent to tank 8 where it is concentrated lactose solution.

The permeate from the NF is sent to the mixing tank 5 where it is mixed with the UF retentate, to result the product of delactosed milk sent to the tank 6, milk that subsequently receives the step of enzymatic cleavage of lactose.

The first step in the process of the present invention is the standardization of milk to be treated. This standardization is carried out playing with two components of milk, one is the fat concentration and protein concentration.

The raw milk is standardized to the required level of fat, i.e. a value of 1.4 to 2.2%, preferably 1.5 to 2.1, even more preferably from 1.6 to 2.0, even better 1.7 to 1.9% butterfat is established.

Meanwhile, the protein level after standardization as follows: A further preferred value of 2.9 to 3.7%, preferably 3.0 to 3.6, 3.1 to 3.5%, even better from 3.2 to 3.4%.

The next step is ultrafiltration, where you get a permeate of UF and a retentate of UF. The permeate is sent to the next step which is the step of nanofiltration NF. The retentate of the ultrafiltration is mixed with the permeate resulting from the NF. The UF permeate obtained is subjected to the process of NF to obtain a retentate (water, lactose and minerals) and a permeate (water and minerals).

EXAMPLES

Example 1

Set the Proportions Obtained of Retained and Permeate

The proportion of the retentate UF used is 64 to 71%, preferably 65 to 70%, even more preferably 66 to 69%, even better 67 to 68%; in combination with NF permeate ratio of: 29 to 36%, preferably 30 to 35%, even more preferably, 31 to 34%, even better from 32 to 33%. In the first instance I would like to emphasize that the optimal value of the UF retentate is 67.5% and the NF permeate is 32.5%. The use of higher proportion of UF retentate will result in a higher level of protein and lactose making the most expensive and sweeter product, sensory away from sweetness to a fresh milk at the moment of doing the hydrolysis of lactose and submit to treatment heat UHT; the use of a smaller proportion gives that the opposite case a less amount of protein and lactose losing sensory attributes to not recover the sweetness of milk after making the hydrolysis of lactose remaining. The different ranges described above are "ideal" for obtaining a good product with an optimal relationship.

Example 2

Establish the Level of Fat to Obtain the Final Product with Good Sensory Profile Is established a value of 1 to 3%, preferably 1.3 to 2.7%, even more preferably from 1.6% to 2.4%, even better from 1.9 to 2.1% butterfat.

The optimum value set forth herein is 2%; lower amount of fat to 1% it will the product loss a sensory attributes, in addition to ascend the protein content as a matter of less added in the standardization in the cream. Amount greater to 3% we will have a product with better sensory performance, but the protein will be diluted and away from its optimum value, in addition to have an increase in calories.

Example 3

Determine the Optimal Range of Protein Concentration in the UF Retentate

Different final concentrations of protein in the retentate were tested. Finding those located between 7.9 to 8.7%, preferably 8.0 to 8.6%, and even more preferably from 8.1 to 8.5% and even better from 8.2 to 8.4% allowed to obtain the level of lactose, protein and desired reconstituted milk calcium.

Example 4

Establish the Protein Level to Obtain the Final Product with Good Sensory Profile Is established a value of protein from 5.0 to 5.8%, preferably from 5.1 to 5.7, more preferably from 5.2 to 5.6%, even better from 5.3 to 5.5%.

The optimum value is 5.4%, a level greater than 5.8%, will make a product very expensive and not necessarily better sensory performance because it also increases the lactose and sweetness at the time of hydrolysis the same, a smaller amount will begin to have negative effects by decreasing sensory mouthfeel given by the protein and the amount of lactose not be sufficient to recover the sweetness of the original milk.

Example 5

The Implementation of the Diafiltration Process in Step NF

It was found that diafiltration could recover higher amount of minerals and aromatic compounds that give more flavor and milky notes.

Example 6

Defines the Optimal Range for Removal of Lactose

This range was between 29 and 36%, preferably between 30 and 35%, and most preferably from 31 to 34% and even better from 32 to 33%; reconstituted milk should be between 2.9 to 3.7% lactose, preferably between 3.0 to 3.6%, and most preferably from 3.1 to 3.5% and more preferably between 3.2 to 3.4% lactose) to generate a sweetness similar to normal pasteurized milk at the time of doing the enzymatic hydrolysis.

Example 8

Establish the Range for the Level Control of Lactose in the NF Retentate when Diafiltration is Used The use of the UF permeate of a milk causes a limitation in the concentration of NF retentate (between lactose and calcium), as there is a risk of crystallization on the membrane (if solubilization of calcium are not undertaken), which is set to maintain a concentration of the retentate between 9 and 10° Bx, preferably 10 to 11° Bx, even more preferably 11 to 12, even better from 12 to 13° Bx while performing the process of diafiltration.

Higher level of lactose to 13° Brix is produced a crystallisation of calcium salts, clogging up the membranes and even damage them, make the diafiltration within 9° Brix "will wash" less of the retentate as a result of less flavor compounds be obtained and at the time of reconstitution of the final product with the UF retentate and permeate diafiltered to the NF the profile of the product would be less milk Raw milk with contain of standardized fat is subjected to UF process wherein a retentate "milk concentrate" is obtained (to a level of protein: from 7.9 to 8.7%, preferably from 8.0 to 8.6%, and even more preferably between 8.1 to 8.5% and even better from 8.2 to 8.4%). Said retentate will be subsequently mixed with the permeate NF resulting with the use of diafiltration in a proportion from 64 to 71%, preferably 65 to 70%, even more preferably 66 to 69%, even better 67 to 68% of the retentate; in combination with NF permeate ratio of: 29 to 36%, preferably 30 to 35%, even more preferably, 31 to 34%, even better from 32 to 33%.

The permeate obtained of the UF is subjected to the NF process to obtain a retentate (water, lactose and minerals) and a permeate (water and minerals).

The filtration process is used primarily to make more efficient the recovery of mineral salts and aromatic compounds that give flavor, and it starts when the level of lactose and calcium is critical (insolubilization of calcium in membranes) in the NF retentate maintaining levels of lactose near to this point but without dilute more the retentate (see ranges). In the diafiltration only the water needed to maximize the recovery of mineral salts and flavor compounds needed to provide better sensory profile is used. The mixture obtained from retentate of UF and the permeate of NF "reconstituted milk" is then subjected to the UHT process for then adding the enzyme needed per container to hydrolyze lactose and recover the remaining sweetness level of a normal milk.

In diafiltration, water is added to the retentate during filtration, to maintain low solutes concentration and minimize saturation of the membrane. Thus, those solutes which are in the retentate, can still pass through the membrane for a longer period of time. The diafiltration can be developed in two different ways. In continuous, dilution water is added continuously during filtration, generally paying attention that the total volume of the feed remains constant. In Batch was allowed to proceed a certain filtration time without adding dilution water. After it has reduced the initial volume by a predefined value, it resets the spent volume with water and let continue the filtration. This process can be repeated several times to achieve the desired goal of separation (Zeman and Zydney, 1996).

It notes that the best method known to the applicant for carrying out the invention is that resulting from the present disclosure.

The invention has been sufficiently described so that a person of ordinary skill in the art can to reproduce and obtain the results mentioned herein. However, any skillful person that in the field of art to which the present invention may be able to make modifications not described in this application, however, if required for the implementation of these changes in a process of free-lactose milk, it is required the matter claimed in the following claims, such systems must be within the scope of the invention.

The invention claimed is:

1. A lactose-removing milk process for the production of milk with a lactose content between 2.7% and 3.5% w/w and a high protein content, which comprises:
   standardizing skim milk;
   subjecting the milk to an ultrafiltration UF step to produce an UF permeate and an UF retentate, wherein the UF retentate has a protein content from 7.9% to 8.7% w/w;
   subjecting the UF permeate to a diafiltration step and a nanofiltration NF step to produce a NF permeate diafiltered and a NF retentate diafiltered, which is maintained at a concentration of 9 to 13° Bx, while the diafiltration step is performed, until recovering the same volume of UF permeate;
   mixing the NF permeate diafiltered with the UF retentate to reconstitute the milk, achieving the desired lactose, lipid and protein content;
   subjecting the reconstituted milk to an UHT process;
   enzymatically hydrolyzing the remaining lactose in the reconstituted milk from the UHT process, and, packaging the reconstituted and enzymatically hydrolyzed milk;

wherein the reconstituted milk having been subjected to the UHT process and to the enzymatically hydrolyzing has a lactose content between 2.7% and 3.5% w/w and a protein content between 5% to 5.8% w/w.

2. The lactose-removing milk process for the production of milk with a lactose content between 2.7% and 3.5% w/w and a high protein content, according to claim 1, wherein the NF retentate diafiltered maintains a retentate concentration of 10 to 13° Bx, while the diafiltration step is performed.

3. The lactose-removing milk process for the production of milk with a lactose content between 2.7% and 3.5% w/w and a high protein content, according to claim 2, wherein the NF retentate diafiltered maintains a retentate concentration 11 to 13° Bx, while the diafiltration step is performed.

4. The lactose-removing milk process for the production of milk with a lactose content between 2.7% and 3.5% w/w and a high protein content, according to claim 2, wherein the NF retentate diafiltered maintains a retentate concentration 12 to 13° Bx, while the diafiltration step is performed.

5. The lactose-removing milk process for the production of milk with a lactose content between 2.7% and 3.5% w/w and a high protein content, according to claim 1, wherein the proportions of the UF retentate and the UF permeate in the UF step are from 55% to 63% by weight of the UF retentate and from 37 to 45% by weight of the UF permeate.

6. The lactose-removing milk process for the production of milk with a lactose content between 2.7% and 3.5% w/w and a high protein content, according to claim 1, wherein the proportions of the UF retentate and the UF permeate in the UF step are from 56% to 62% by weight of the UF retentate and from 38 to 44%, by weight of the UF permeate.

7. The lactose-removing milk process for the production of milk with a lactose content between 2.7% and 3.5% w/w and a high protein content, according to claim 1, wherein the proportions of the UF retentate and the UF permeate in the UF step are from 57 to 61% by weight of the UF retentate and from 39 to 43% by weight of the UF permeate.

8. The lactose-removing milk process for the production of lactose-free milk with high protein content, according to claim 1, wherein the proportions of the UF retentate and the UF permeate in the UF step are from 58 to 60% by weight of the UF retentate and from 40 to 42% by weight of the UF permeate.

9. The lactose-removing milk process for the production of milk with a lactose content between 2.7% and 3.5% w/w and a high protein content, according to claim 1, wherein the proportions of the NF retentate diafiltered and the NF permeate diafiltered in the NF step are from 30% to 38% by weight of the NF retentate diafiltered and; from 62% to 70% by weight of the NF permeate diafiltered.

10. The lactose-removing milk process for the production of milk with a lactose content between 2.7% and 3.5% w/w and a high protein content, according to claim 1, wherein the proportions of the NF retentate diafiltered and the NF permeate diafiltered in the NF step are from 31% to 37% by weight of the NF retentate diafiltered and; from 63% to 69% by weight of the NF permeate diafiltered.

11. The lactose-removing milk process for the production of milk with a lactose content between 2.7% and 3.5% w/w and a high protein content, according to claim 1, wherein the proportions of the NF retentate diafiltered and the NF permeate diafiltered in the NF step are from 32% to 36% by weight of the NF retentate diafiltered and; from 64% to 68% by weight of the NF permeate diafiltered.

12. The lactose-removing milk process for the production of milk with a lactose content between 2.7% and 3.5% w/w and a high protein content, according to claim 1, wherein the proportions of the NF retentate diafiltered and the NF permeate diafiltered in the NF step are from 33% to 35% by weight of the NF retentate diafiltered and; from 65% to 67% by weight of the NF permeate diafiltered.

13. The lactose-removing milk process for the production of milk with a lactose content between 2.7% and 3.5% w/w and a high protein content, according to claim 1, wherein the UF and the NF steps remove from 35% to 40% by weight of lactose and wherein the reconstituted milk has a protein content of 5.0% to 5.8% w/w.

14. The lactose-removing milk process for the production of milk with a lactose content between 2.7% and 3.5% w/w and a high protein content, according to claim 1, wherein the UF and the NF steps remove from 36% to 39% by weight of lactose and wherein the reconstituted milk has a protein content of 5.1% to 5.7% w/w.

15. The lactose-removing milk process for the production of milk with a lactose content between 2.7% and 3.5% w/w and a high protein content, according to claim 1, wherein the UF and the NF steps remove from 37% to 38% by weight of lactose and wherein the reconstituted milk has a protein content of 5.2% to 5.6% % w/w.

16. The lactose-removing milk process for the production of milk with a lactose content between 2.7% and 3.5% w/w and a high protein content, according to claim 1, wherein the UF and the NF steps remove from 37% to 38% by weight of lactose and wherein the reconstituted milk has a protein content of 5.3% to 5.5% w/w.

17. The lactose-removing milk process for the production of milk with a lactose content between 2.8% and 3.4% w/w and a high protein content, according to claim 1, wherein the reconstituted milk has a lactose content of 2.8% to 3.4% w/w and a protein content of 5.0% to 5.8% w/w.

18. The lactose-removing milk process for the production of milk with a lactose content between 2.9% and 3.3% w/w and a high protein content, according to claim 1, wherein the reconstituted milk has a lactose content of 2.9% to 3.3% w/w and a protein content of 5.1% to 5.7% w/w.

19. The lactose-removing milk process for the production of milk with a lactose content between 3.0% and 3.2% w/w and a high protein content, according to claim 1, wherein the reconstituted milk has a lactose content of 3.0% to 3.2% w/w and a protein content of 5.2% to 5.6% w/w.

20. The lactose-removing milk process for the production of milk with a lactose content between 3.0% and 3.2% w/w and a high protein content, according to claim 1, wherein the reconstituted milk has a lactose content of 3.0% to 3.2% w/w and a protein content of 5.3% to 5.5% w/w.

21. The lactose-removing milk process for milk production, according to claim 1, characterized in that semi-skim milk is standardized to 1.4% by weight of fat content.

* * * * *